Jan. 19, 1926.　　　　　　　　　　　　　　　　　　　1,570,342
R. A. DRESSER
CROWBAR
Filed April 24, 1925
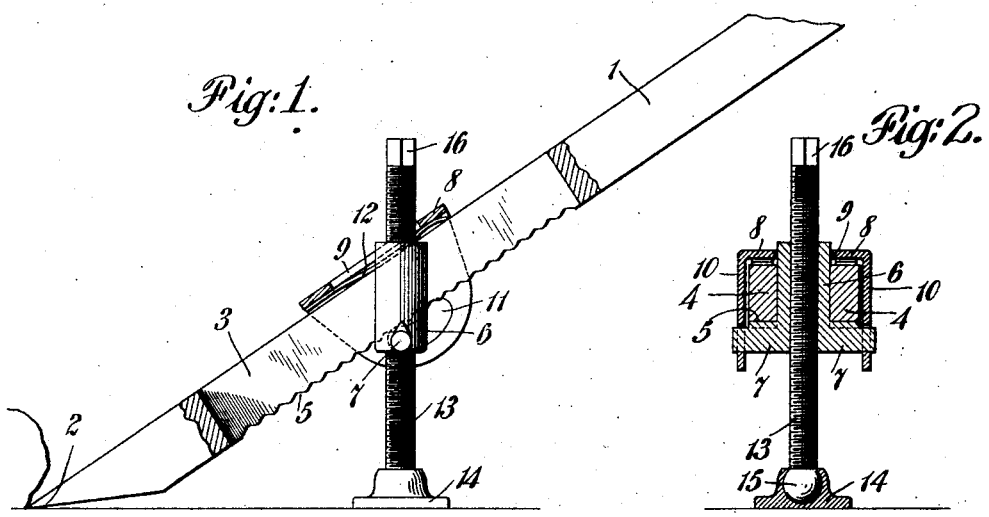
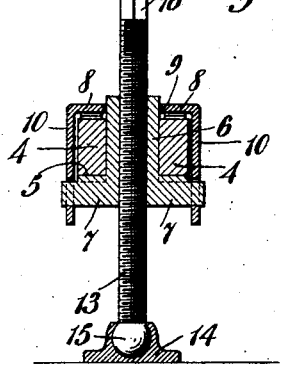
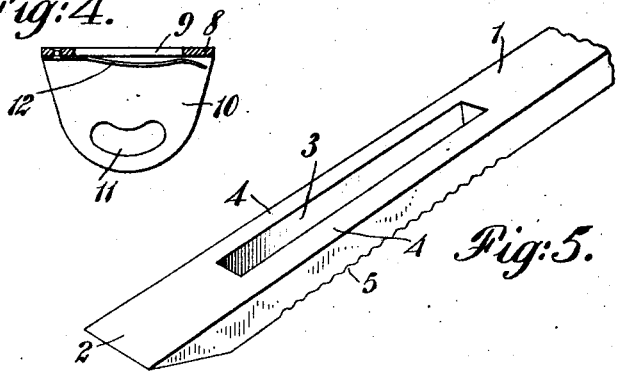
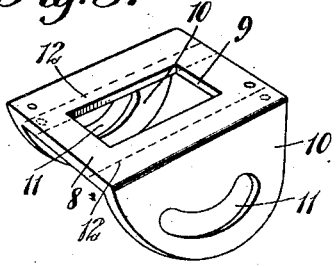
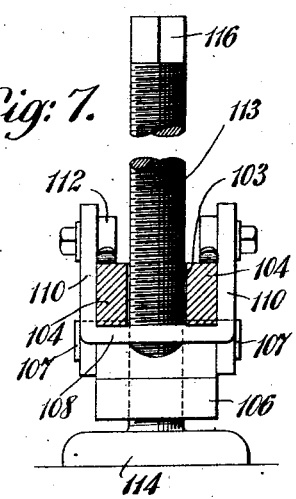
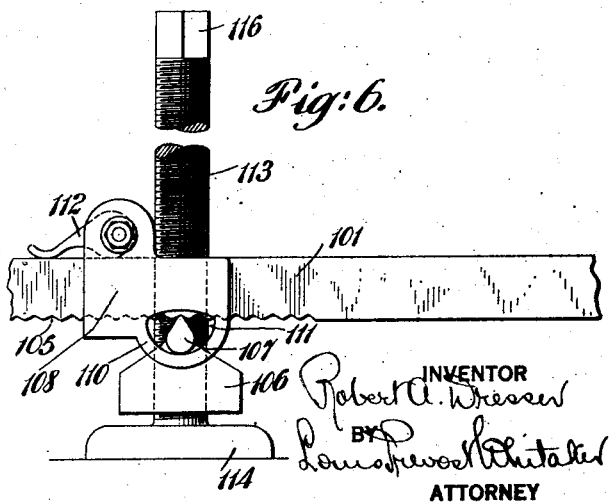
INVENTOR
Robert A. Dresser
BY
Louis Prevost Whitaker
ATTORNEY Patented Jan. 19, 1926.

1,570,342

UNITED STATES PATENT OFFICE.

ROBERT A. DRESSER, OF BRADFORD, PENNSYLVANIA, ASSIGNOR OF ONE-FOURTH TO LELAND JONES, OF MILES, OHIO, AND ONE-FOURTH TO JOHN MARTIN KELLY, OF PITTSBURGH, PENNSYLVANIA.

CROWBAR.

Application filed April 24, 1925. Serial No. 25,494.

*To all whom it may concern:*

Be it known that I, ROBERT A. DRESSER, a citizen of the United States, residing at Bradford, in the county of McKean and State of Pennsylvania, have invented certain new and useful Improvements in Crowbars; and I do hereby declare the following to be a full, clear, and exact description of the invention, such as will enable others skilled in the art to which it appertains to make and use the same.

My invention consists in the novel features hereinafter described, reference being had to the accompanying drawings which show two forms in which I have contemplated embodying my invention, selected by me for purposes of illustration, and the said invention is fully disclosed in the following description and claims:

The object of my invention is to provide a crowbar with a fulcrum connected therewith and capable not only of adjustment longitudinally with respect to the bar, but also in a direction transversely thereof to vary the height of the fulcrum from the ground or other support. It frequently happens that when it is desired to employ a crowbar, there is no stone block or other suitable object at hand to serve as a fulcrum, or if at hand it is not of suitable size to afford the proper support for the bar. Such an extemporized fulcrum is also very apt to slip with respect to the bar. My invention overcomes these difficulties and provides a crowbar with a fulcrum adapted to practically all conditions of use, while the bar can be used without reference to it if desired by either removing the device or turning the bar over.

In the drawings,

Fig. 1 is a side elevation partly in section of a portion of a crowbar embodying my invention, the bar being broken away.

Fig. 2 is a transverse sectional view of the same.

Fig. 3 is a detail perspective view of the housing.

Fig. 4 is a sectional view of the same.

Fig. 5 is a detail view of the bar broken away with the fulcrum detached.

Fig. 6 is a side view of a slightly modified construction, the bar being broken away.

Fig. 7 is a transverse section of the modified form of the bar showing the fulcrum in elevation.

In the form of my invention shown in Figs. 1 to 5, inclusive, 1 represents the bar which preferably has a wedge shaped end, 2, and is provided adjacent to said end with a longitudinal vertically disposed slot, 3, having separated portions, 4—4 on opposite sides thereof, said lateral portions preferably having their lower faces serrated or corrugated as indicated at 5.

6 represents a movable block adapted to extend vertically through the slot, 3, and provided at its lower end with fulcrum lugs, 7, having inverted V shaped edges disposed transversely of the bar, and engaging the corrugated faces, 5—5, of the bar. The block can be moved lengthwise in the slot, 3, and is held in engagement with the bar in any desired way. As herein shown, I provide for example a housing or keeper, having a plate portion, 8, extending across the slotted portion of the bar and provided with a slot, 9, through which the block, 6, may project, said plate having downwardly extending side flanges, 10, provided with curved slots, 11, engaging the lower edges of the lugs, 7, which are preferably rounded. The underside of the top plate, 8, of the housing is provided with oppositely disposed flat springs, 12, engaging the upper faces of the portions, 4—4, of the bar and holding the V shaped portions of the lugs in engagement with aligned corrugations in the lower face of the bar. The block, 6, is provided with a vertical threaded aperture through which a screw threaded rod, 13, extends, the lower end of which is provided with a support, 14, having a flat and fairly broad bottom face and preferably connected to the screw rod, 13, by a pivotal connection, preferably of the ball and socket type, although this is not essential, as the base may be rigidly connected to the screw or formed integrally therewith.

It will be seen that this construction provides the bar with a fulcrum which can be adjusted longitudinally of the bar by depressing the housing and sliding it along the bar, and which can be adjusted vertically with respect to the ground by simply turning the screw. The broad base, 14, gives a good support, even in soft material or ground and the universal joint enables the bar to be swung laterally around the fulcrum as a pivotal center. The screw rod, 13, is preferably formed with a polygonal head of a diameter not greater than the threaded portion as shown at 16, to enable the screw to be adjusted, and to permit it to be removed from the block if it is desired to use the bar without it. However, the bar can be used like an ordinary bar by moving the fulcrum, to the rear end of the slot or by turning the bar over.

In Figs. 6 and 7 I have shown a slight modification, in which the bar is indicated at 101, the slot therein at 103, the lateral portions of the bar at 104 and the corrugated faces at 105. In this instance the block, indicated at 106, is located below the bar and provided with lateral fulcrum lugs, 107, having the V shaped edges engaging the corrugated surface of the bar. The housing or keeper comprises the lateral portions of flanges, 110, connected by a plate, 108, said flanges being provided with slots or recesses, 111, engaging the lugs, 107, and with lever cams, 112, for clamping the housing or keeper to the bar when it has been adjusted longitudinally thereof to the desired position.

The block, 106, is provided with a threaded aperture to receive a screw rod, 113, having a base, 114, in this instance formed integrally therewith or screwed thereto.

This construction permits of the use of a heavy screw rod, of diameter nearly equal to the width of the slot. The operation of the device, in use, will be substantially the same as that previously described. The adjustable fulcrum can be removed if desired by unscrewing the screw, 113, until it disengages the slot, loosening the lever cams, 112, and slipping the keeper or housing off of the bar.

What I claim and desire to secure by Letters Patent is:

1. The combination with a crowbar, of a fulcrum comprising a block connected to said bar by means permitting it to slide freely longitudinally of said bar, said block being provided with horizontally disposed pivotal portions for engaging one face of the bar at different points longitudinally thereof, said block being provided with a ground engaging part having a threaded engagement therewith, and adjustable with respect to said block in a direction transversely with respect to the bar.

2. The combination with a crowbar, of a fulcrum connected to said bar by means permitting it to slide freely longitudinally of said bar, and having horizontally disposed portions for engaging one face of the bar, a screw threaded rod extending through a threaded aperture in said block and provided at one end with a ground engaging portion, and means for holding said horizontally disposed portions of the block from movement longitudinally of the engaged face of the bar.

3. The combination with a crowbar, of a fulcrum comprising a block adjustable longitudinally with respect to the bar, said bar and block being provided the one with a corrugated face and the other with pivot portions for engaging said corrugated face, to provide a pivotal connection, and to hold said parts against relative movement in a direction longitudinally of the bar, and a ground engaging part carried by said block and adjustable with respect thereto in a direction longitudinally of said ground engaging portion and transversely of the bar.

4. The combination with a crowbar, of a fulcrum comprising a block, adjustable longitudinally with respect to the bar, said bar and block being provided the one with a corrugated face and the other with pivot portions for engaging said corrugated face, to provide a pivotal connection and to hold said parts against relative movement in a direction longitudinally of the bar, a screw engaging a threaded aperture in said block, and provided at one end with a ground engaging portion and at the other end with means for rotating the screw and means for retaining the block in its adjusted position with respect to the bar.

5. The combination with a crowbar having a longitudinal slot, and having the lateral portions on opposite sides of said slot, provided with corrugated lower faces of a block provided with fulcrum lugs for engaging said corrugated faces, and a screw rod extending through said block and through the slot in the bar, and provided at its lower end with a ground engaging portion.

6. The combination with a crow bar having a longitudinal slot, and having the lateral portions on opposite sides of said slot, provided with corrugated lower faces of a block provided with fulcrum lugs for engaging said corrugated faces, and a screw rod extending through said block and through the slot in the bar, and provided at its lower end with a ground engaging portion, and a keeper having a sliding engagement with said bar, and provided with means for holding said fulcrum in engagement with said corrugated surfaces.

In testimony whereof I affix my signature.

ROBERT A. DRESSER.